(No Model.) 2 Sheets—Sheet 1.

C. T. SCHOEN.
CENTER BEARING PLATE FOR CARS.

No. 416,274. Patented Dec. 3, 1889.

WITNESSES
F. L. Durand
G. M. Copenhaver

INVENTOR
Charles T. Schoen
by M. H. Zincrell
Attorney.

(No Model.) 2 Sheets—Sheet 2.
C. T. SCHOEN.
CENTER BEARING PLATE FOR CARS.
No. 416,274. Patented Dec. 3, 1889.
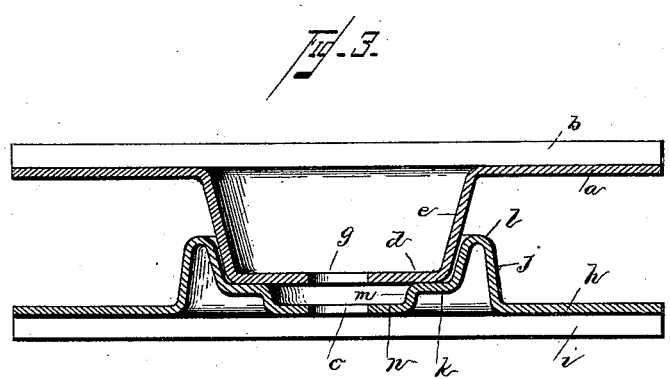
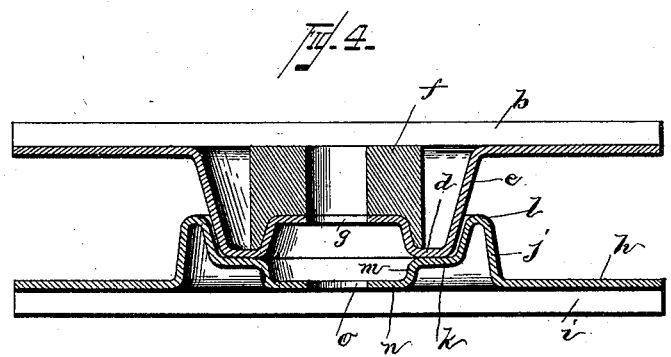

UNITED STATES PATENT OFFICE.

CHARLES T. SCHOEN, OF PHILADELPHIA, PENNSYLVANIA.

CENTER-BEARING PLATE FOR CARS.

SPECIFICATION forming part of Letters Patent No. 416,274, dated December 3, 1889.

Application filed October 14, 1889. Serial No. 326,931. (No model.)

*To all whom it may concern:*

Be it known that I, CHARLES T. SCHOEN, a citizen of the United States, residing at Philadelphia, in the county of Philadelphia and State of Pennsylvania, have invented a certain new and useful Improvement in Center-Bearing Plates for Railway-Cars, of which the following is a full, clear, and exact description.

This invention relates to center-bearing plates for railway-cars, and more particularly to that class of such articles manufactured of pressed steel or other wrought metal.

The object of the invention is to make a plate in which is a central bearing to sustain the load, prevent crushing, and equalize the load when the cars are laterally inclined.

The invention consists in center-bearing plates in which the upper plate is made with a depending bearing and the lower plate is made with a rising bearing, having a seat for the depending bearing of the upper plate, and a rim projection above such seat to prevent the lateral escape of the upper bearing, the bearings in both plates being returned to the base-line of the plates to afford central bearings for the plates to prevent crushing, and the plane of contact of the bearings of the two plates being parallel with the bases of said plates to prevent disturbance of the load when the cars are laterally inclined, substantially as hereinafter set forth and claimed.

Figure 1:
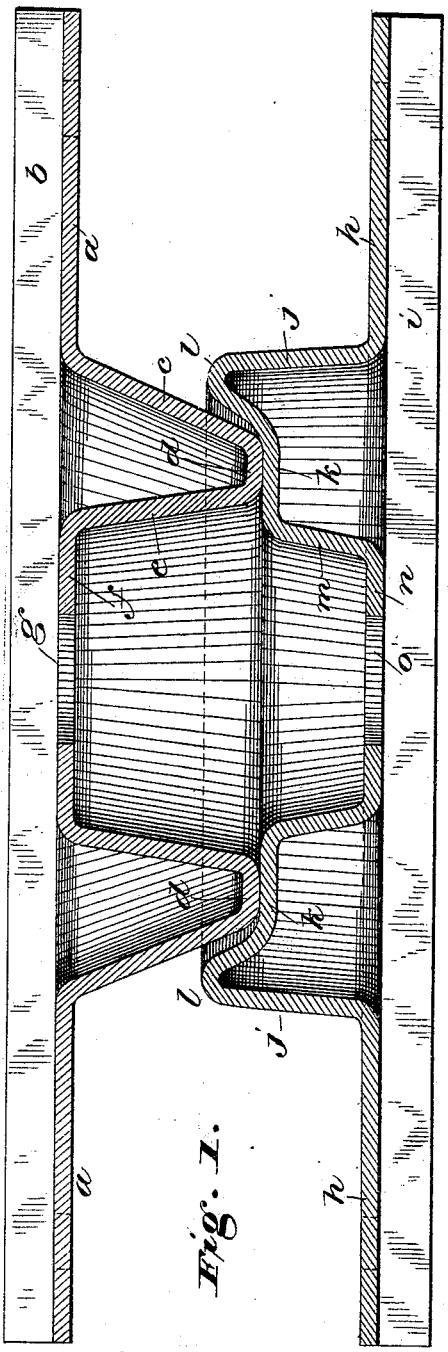
Figure 2:
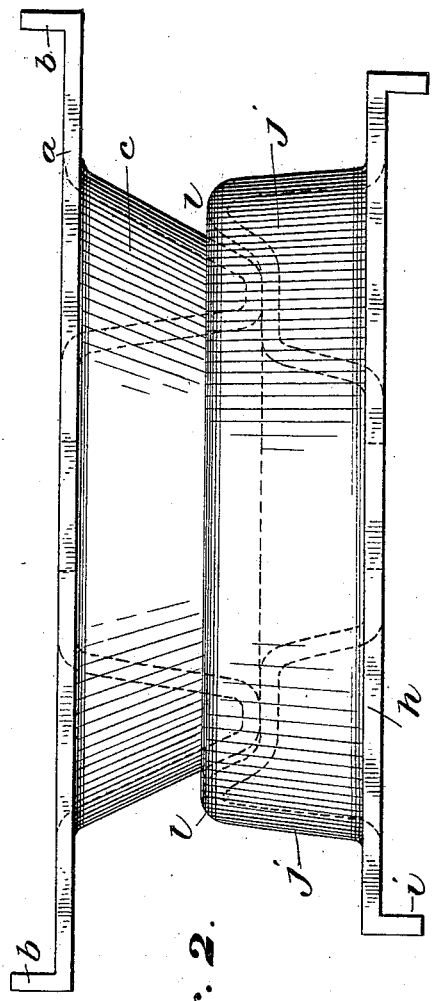

In the accompanying drawings, illustrating my invention, in the several figures of which like parts are similarly designated, Figure 1 is a longitudinal section, and Fig. 2 is an end elevation. Figs. 3 and 4 are longitudinal sections of modifications.

The base $a$ of the upper plate is made with longitudinal flanges $b$ to engage the car-body timbers, and it is provided also with bolt-holes, as usual, and also studs, if desired, as in the center-bearing plates of my former inventions. The base is made with a central depression or depending bearing $c$, whose end may be flat, as at $d$, and which is returned at $e$ to the base-line of the base $a$, and there provided with a flange $f$ parallel with the base. This flange has the king-bolt hole $g$. The return of the depending bearing re-enforces the plate and prevents crushing. The lower plate has a base $h$, with flanges $i$, bolt-holes, and studs, as needed, for engaging the timbers of the car-truck, and it is made with a central bearing $j$ rising from it and having a flat seat $k$ to receive the depending bearing of the upper plate in a plane parallel with the bases of the plates. The bearing $j$, moreover, is projected beyond the seat $k$ to form a rim projection $l$, surrounding the bearing $c$ and circumscribing its lateral motion. The said bearing drops from the seat $k$ by a return $m$ and flange $n$ to the base-line of the plate, and so re-enforces the lower plate. The flange $n$ is provided with the king-bolt hole $o$, which is in alignment with the king-bolt hole $g$ in the upper plate.

I prefer to make the surface $d$ of the upper plate-bearing and the seat $k$ of the lower plate-bearing flat, for I have found that where the contact-surfaces of the bearing-plates are curvilinear there is a tendency to shift the load in rounding curves, and this difficulty is overcome with the construction mentioned. There is enough space between the bearing $c$ and the rim $l$ to permit all necessary play of the plates one upon another without the plates getting out of center.

The plates and their returned central bearings are integral, by preference, and may be struck up in dies or pressed from steel plate, or they may be otherwise manufactured. The bearings may be made separate wholly or in part and attached to the structure, and this is especially true of the smaller-size plates, as indicated in Figs. 3 and 4, wherein in Fig. 3 there is no return and in Fig. 4 the bearing is separate.

While I prefer the construction and arrangement of parts shown, yet it is within my invention to reverse these parts and make the upper plate as the lower one is shown, and vice versa.

What I claim is—

1. Center-bearing plates of wrought metal provided with integral bearings having flat contact-surfaces, and a rim projection from one of the plates surrounding or circumscribing the bearing from the other, substantially as described.

2. Center-bearing plates in which the upper plate is made with a depending bearing and the lower plate is made with a rising bearing having a seat for the depending bearing of the upper plate, and a rim projection above such seat to prevent the lateral escape of the upper bearing, the bearings in both plates being returned to the base-line of the plates to afford central bearings for the plates to prevent crushing, and the plane of contact of the bearings of the two plates being parallel with the bases of said plates to prevent disturbance of the load when the cars are laterally inclined, substantially as described.

In testimony whereof I have hereunto set my hand this 12th day of October, A. D. 1889.

CHARLES T. SCHOEN.

Witnesses:
WM. H. SCHOEN,
WM. H. LEWIS.